US006854739B2

(12) United States Patent
Schleth et al.

(10) Patent No.: US 6,854,739 B2
(45) Date of Patent: Feb. 15, 2005

(54) SEALING RING

(75) Inventors: Andreas Schleth, Esslingen (DE); Winfried Schulz, Neuhausen (DE); Hans-Walter Brenner, Stuttgart (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 10/622,041

(22) Filed: Jul. 17, 2003

(65) Prior Publication Data

US 2004/0036233 A1 Feb. 26, 2004

(30) Foreign Application Priority Data

Aug. 23, 2002 (EP) ........................................... 02018818

(51) Int. Cl.[7] ................................................ F16J 15/02

(52) U.S. Cl. ....................... 277/642; 277/637; 277/644; 277/626

(58) Field of Search ................................ 277/612, 619, 277/626, 627, 644, 638, 642

(56) References Cited

U.S. PATENT DOCUMENTS 494,402 A * 3/1893 Walsh ........................ 277/649
2,513,178 A * 6/1950 Jackson ...................... 285/363
2,722,043 A * 11/1955 Nenzell ..................... 49/479.1
3,231,289 A * 1/1966 Carrell ....................... 277/632
3,930,656 A * 1/1976 Jelinek ....................... 277/611
4,254,960 A * 3/1981 Jelinek ....................... 277/644
4,616,857 A * 10/1986 Woodman et al. ....... 285/123.3
4,690,438 A * 9/1987 Kanczarek .................. 285/363
5,342,096 A * 8/1994 Bachle et al. ................. 285/23
6,173,969 B1 * 1/2001 Stoll et al. .................. 277/630
6,305,695 B1 * 10/2001 Wilson ....................... 277/584
6,669,205 B2 * 12/2003 Schenk ....................... 277/628
2002/0030326 A1 3/2002 Bettencourt

FOREIGN PATENT DOCUMENTS

DE 1806617 5/1970
DE 3918891 C2 9/1990
DE 4309652 A1 10/1994
EP 0922888 A2 6/1999
FR 2775045 8/1999

* cited by examiner

*Primary Examiner*—Alison K. Pickard
(74) *Attorney, Agent, or Firm*—Hoffman & Baron, LLP

(57) ABSTRACT

A sealing ring (12) has an annular principal body (15) responsible for its dimensional stability, such body having an annular groove on at least one axial side, in which groove a sealing body (16), consisting of rubber-elastic material, is held. The sealing body (16) has a sealing bead (24) projecting axially past the principal body (15). The capacity of the annular groove (25) is at least equal to the volume of the sealing body (16) so that the annular groove (25) is in a position of receiving the material of the sealing body (16) defining its sealing bead (24) during action on and deformation of the sealing bead (24).

17 Claims, 3 Drawing Sheets

SEALING RING

FIELD OF THE INVENTION

The invention relates to a sealing ring comprising an annular principal body responsible for dimensional stability and which on at least one axial side possesses a concentrically arranged annular groove having two radially opposite groove flanks, in which a sealing body, manufactured of rubber-elastic material, is held, which has a sealing bead projecting axially past the principal body.

BACKGROUND OF THE INVENTION

A sealing ring of this type disclosed in the European patent publication 0 922 888 A2 possesses a principal body consisting of a thermoplastic plastic material, which on one axial side bears a sealing body, concentric to the principal body, of elastomeric plastic material. The sealing body is seated in an annular groove in the principal body and a sealing bead on it projects clear of the annular groove axially past the principal body. During use the sealing ring may be placed between two sealing faces, which are to make sealing engagement with each other, on two components, the sealing bead being engaged and deformed by the one sealing face when the two components are firmly engaged with one another. It is in this manner that a sealing engagement is produced between the respective component and the sealing body.

If the two components to be connected together are too firmly engaged with each other, the sealing body may be damaged owing to the excessive compressing action. More particularly, there is the danger of the sealing bead being partly or completely shorn off. In order to deal with such problems there has already been a suggestion in the German patent publication 3,918,891 C2 to arrange the sealing body on the radially aligned inner face of an L-like principal body. The principal body in this case serves as a fixed abutment for limiting movement toward each other of the components to be connected so that crushing of the sealing body is prevented. The sealing body itself can move clear radially inward, something which means that the establishment of opposing forces is limited and accordingly the surface pressure, which is responsible for the seal quality, between the sealing face of the component and the sealing body of the sealing ring is not particularly high.

SUMMARY OF THE INVENTION

One object of the present invention is to create a sealing ring of the type initially mentioned, in the case of which, in conjunction with a high sealing quality the danger of damage to for the sealing body is reduced.

In order to achieve such aim the capacity of the annular groove is at least equal to the volume of the sealing body so that the annular groove is in a position of also accepting the material, which defines the sealing bead, of the sealing body when the sealing bead is acted upon and deformed.

It is in this manner that it is possible for the sealing bead to be displaced into the annular groove under the action of a component cooperating with it for sealing, the capacity of the groove being so selected that the entire volume of the incompressible sealing body fits into it. This means that crushing of the sealing body is prevented. Since the sealing bead is thrust into the annular groove, which is flanked on either side by the groove flanks, the material of the sealing body is prevented from being able to move completely freely so that an opposing force sufficient for reliable sealing contact is built up. In the annular groove of the principal body the sealing body experiences a predetermined, permissible deformation. Furthermore on tightening up of the component to be sealed owing to the considerably increasing resistance on engagement of the component with the principal body made of harder material the condition may be sensed in which the sealing body is completely thrust back into the annular groove. Accordingly the following final tightening up of the component may take place with a controlled or selected force which ensures the desired strength of the connection while at the same time preventing damage to the sealing ring. Since the sealing body is not damaged during use of the sealing ring the sealing ring is generally able to be used more than once.

Further advantageous developments of the invention are defined in the claims.

The flanks of the annular groove are preferably so designed with an oblique form that they run together in the depth direction of the groove. At the groove opening the annular groove is preferably wider than at the floor thereof.

In order to provide for the desired capacity of the annular groove an annular free space is preferably provided within the annular groove radially on either side of the sealing bead to receive the deformed material of the sealing bead. These free spaces are preferably delimited on the one hand by the sealing bead and on the other hand by the associated groove flank. This may be more particularly ensured if the sealing body has a base section engaging the groove floor and bearing on the two groove flanks, from which base section the sealing bead axially projects, the sealing bead having a smaller width than the width of the annular groove.

The inner free space provided within the sealing bead preferably has a larger cross section than the outer free space provided radially outside the sealing bead. Preferably, the inner free space is furthermore made deeper than the outer free space. Moreover the inner free space may be wider at the groove opening than the outer free space. Each of these measures improves the deformation properties of the sealing bead so that same tends to be more readily bent over in the radially inward direction than in the radially outward direction, when it is axially acted upon by the sealing face of the component which is to be sealed. This means more particularly that it is possible to prevent the sealing bead being deformed radially outward past the annular groove and possibly assuming a position between the sealing face of the component and the principal body. Accordingly there is improved reliability as regards possible damage to the sealing body.

Preferably both the principal body and also the at least one sealing body are manufactured of plastic material. As a material for the principal body the use of a thermoplastic plastic material is recommended and as a material for the at least one sealing body an elastomeric plastic material is preferred. Preferably, the respective sealing body is molded on the principal body by injection molding. If the sealing ring is provided at both axial sides with a respective sealing body received in a suitably designed annular groove, it is possible for the two sealing bodies to be molded on separately from each other on the principal body, although there is also the possibility of uniform production by providing the principal body with connection ducts extending between the two annular grooves, through which the elastomeric plastic material may pass during injection molding so that the sealing bodies produced are finally integrally connected by bridges of material.

At its inner periphery the sealing ring will preferably possess a plurality of retaining projections distributed about the periphery, such retaining projections being formed integrally with at least one sealing body and extending radially inward in relation to the principal body. The retaining projections may during use ensure tethering of the covering band so that it cannot be lost, when for example it is placed on the external thread of a screw member. In this case the retaining projections may exert a centering action and prevent transverse displacement of the sealing ring in relation to the component to be sealed off.

The sealing ring is more especially suitable for producing a sealing action between two axially facing seal faces, which are provided on two fluid power components to be connected together by turning. One of the components may be a screw part, as for example a plug or a screw thread structure, which possesses a spigot-like screw component having an external screw thread, which may be screwed into the internal screw thread of another component, as for instance of a valve or a fluid power drive cylinder. The sealing ring is in this case slipped coaxially over the threaded part, any retaining projections present serving for securing it on the threaded part.

BRIEF DESCRIPTION OF THE DRAWINGS

In the following the invention will be described with reference to the accompanying drawings in detail.

DETAILED DESCRIPTION OF THE PREFERRED EMBODIMENTS

Figure 1:
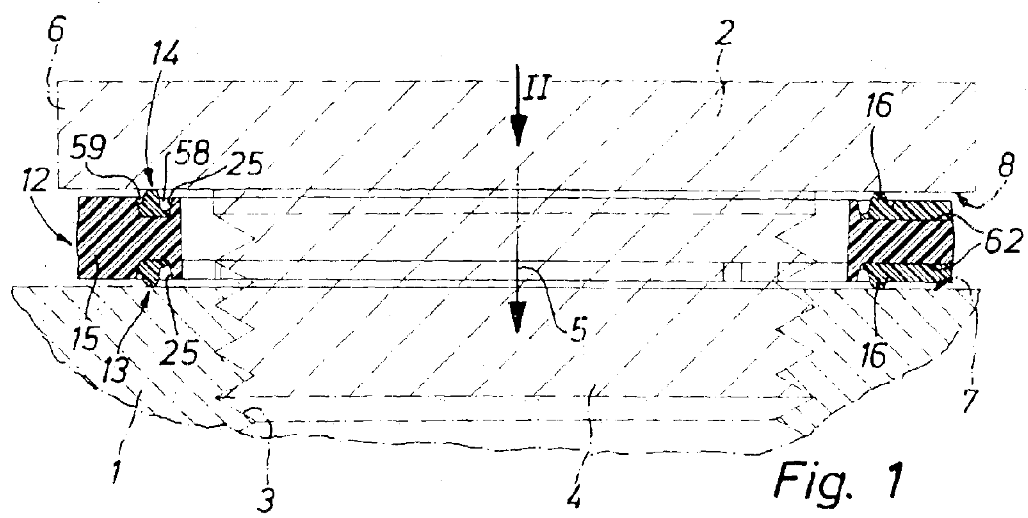
FIG. 1 shows a preferred embodiment of the sealing ring in accordance with the invention in a section having a section line with an axially and radial plane of section as indicated at I—I in FIG. 2, two components to be connected together in a fluid-tight manner being indicated in chained lines diagrammatically.
Figure 2:
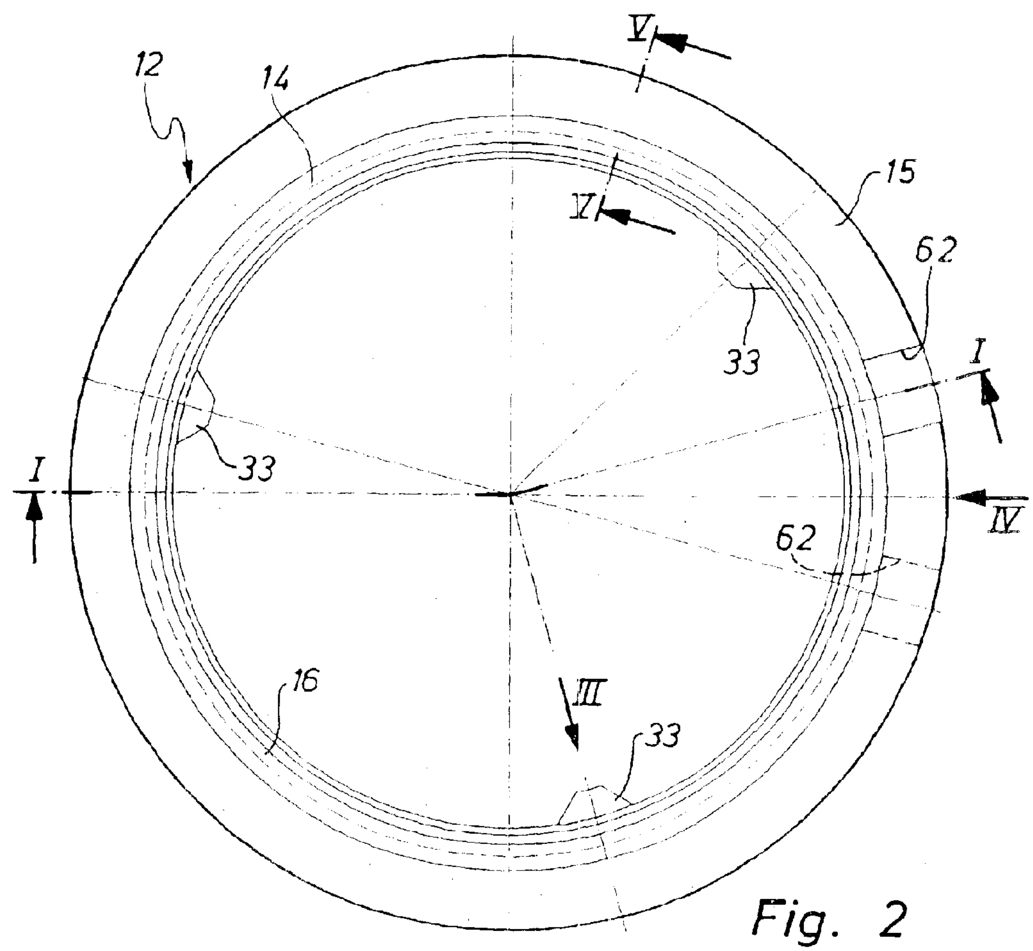
FIG. 2 shows the sealing ring of FIG. 1 in a plan view as indicated by the arrow II in FIG. 1.
Figure 3:
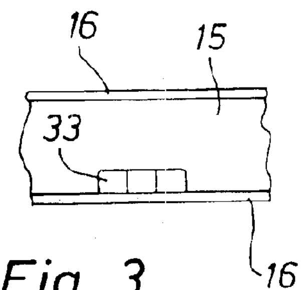
FIG. 3 is a view of part of the sealing ring of FIG. 2 looking in the direction of arrow III in the vicinity of a retaining projection.
Figure 4:
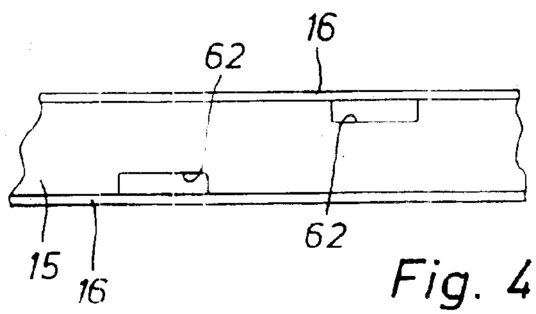
FIG. 4 is an external view of the sealing ring of FIG. 2 looking in the direction of the arrow IV in the vicinity of the sprues of the sealing body molded on by injection molding.

In chained lines FIG. 1 shows diagrammatically two components 1 and 2 to be connected together in a fluid-tight fashion in a sectional view. The first component 1 possesses a duct-like recess 3, which is provided with an internal screw thread. The second component 2 possesses a for example shank- or spigot-like threaded part 4, which is provided with an external screw thread matching the internal screw thread in the recess 3. Accordingly the screw threaded part 4 may be screwed into the recess 3, it shifting in position in the direction of movement 5 indicated by an arrow in relation to the first component 1.

On an axial end of the screw threaded part 4 the second component 2 has an annular projection 6 radially projecting past the screw threaded part 4. The annular projection may for example be constituted by an actuating section of the second component 2, which renders possible the application of a wrench tool.

In the condition of the screw threaded part 4 screwed into the recess two annular sealing faces on the components 1 and 2 are axially opposite to each other. The first annular sealing face 7 is located on the first component 1 in the peripheral portion of the opening of the recess 3. The opposite second annular sealing face 8 is located radially outside the screw threaded part 4 on the side, axially facing the first component 1, of the annular projection 6.

The second component 2 of the working embodiment is constituted by a plug, which is screwed into the recess 3 in order to seal same in a fluid-tight fashion. In the case of the first component 1 it may in the present case be a question of a component, which contains a fluid, as for example compressed air or oil. Loss of fluid is prevented by the screwed in plug.

In the case of design, not illustrated in detail, the component 2 constitutes a connection part, which has a continuous duct, and which is connected or able to be connected with a flexible or rigid fluid duct leading to other equipment. In the condition screwed into the first component 1 a fluid connection is then produced between the duct-like recess 3 and through the second component 2, the associated fluid duct. The latter represents a typical application in the pneumatics or hydraulics sector, the first component 1 being for example a valve or a drive to be actuated by fluid power.

In order to provide a seal between the two components 1 and 2 the sealing ring 12 in accordance with the invention is provided. FIGS. 1 through 7 on the one hand and FIGS. 8 and 9 on the other hand show two preferred working examples of this sealing ring 12. In the mounted state the sealing ring 12, as illustrated in FIG. 1, assumes a coaxial position between the two mutually facing sealing faces 7 and 8 of the two components 1 and 2 between which a seal is to be produced. The screw threaded part 4 is in this case inserted through the sealing ring 12.

On each of its two axial sides turned in opposite axial directions the sealing ring 12 possesses an annular sealing section 13 and 14. In the position of use indicated in FIG. 1 the first sealing section 13 faces the first sealing face 7 and the second sealing section 14 faces the second sealing face 8. In order to produce the sealed connection the second component 2 is then screwed into the recess 3 with a sufficient torque so that the above mentioned sealing sections 13 and 14 are acted upon by the annular sealing faces 7 and 8 with the application of an axially directed pressing force. This pressing force produces a sealing effect, which as desired prevents loss of fluid between the two components 1 and 2.

Preferably, the sealing ring 12 is composed of a plurality of bodies molded together during an injection operation to give an integral structural unit. These bodies are in the working embodiment an annular principal body 15 and two also annular sealing bodies 16. The bodies are, as appears from FIGS. 2 and 9, arranged concentrically to one another.

On each axial side of the principal body 15 one of the sealing bodies 16 is located. Each sealing body 16 is locked in an annular groove 25, which is sunk into the principal body 15 on the respective axial side with a concentric arrangement. Preferably, the two annular grooves have the same diameter and the same cross sectional configuration.

Figure 5:
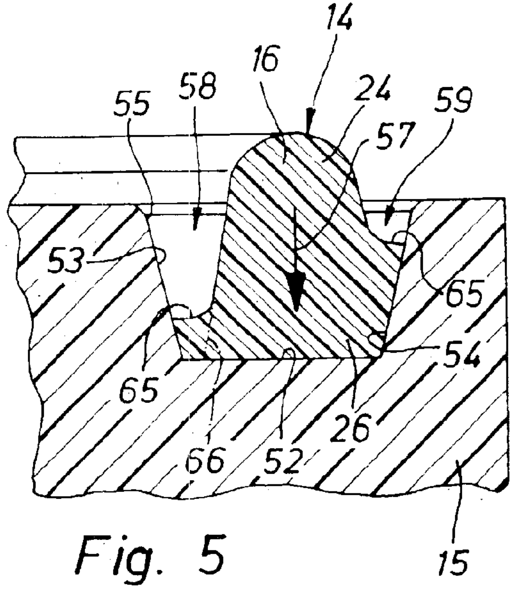
FIG. 5 shows on a larger scale part of a cross section taken through the sealing ring of FIG. 2 on the cross section line V—V, the initial position being illustrated.
Figure 6:
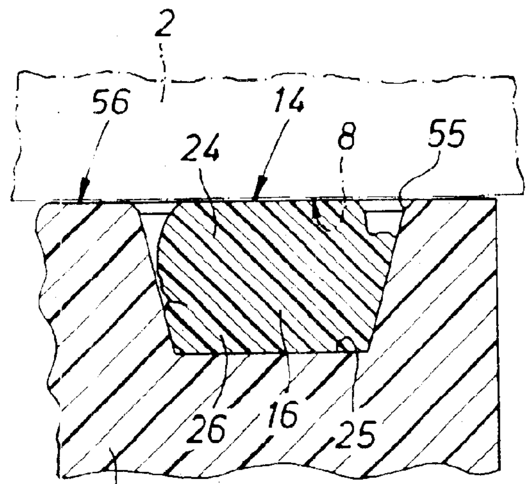
FIG. 6 shows in a manner of similar representation a part of the sealing ring in a condition, in which a component to be sealed has been urged into position gently by hand onto the principal body and against the sealing ring.
Figure 7:
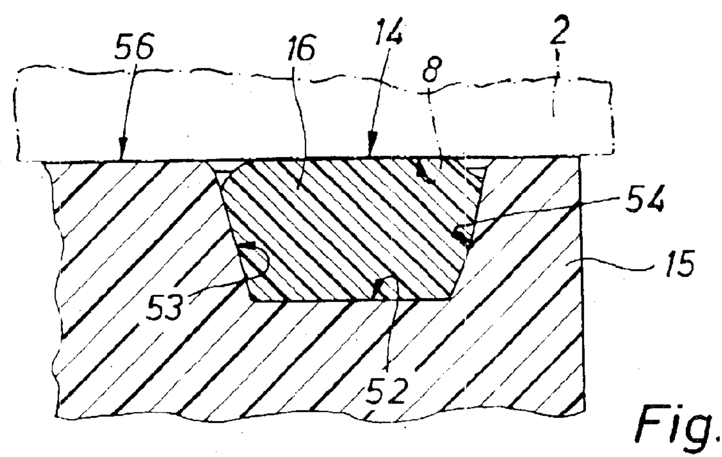
FIG. 7 shows in a manner of representation similar that of FIGS. 5 and 6 a part of the sealing ring of FIG. 2 in a state, in which the component to be sealed is braced against sealing ring to apply the maximum load desired.

As well shown in FIGS. 5 through 7, each annular groove has an axially aligned groove floor 52 and two radially opposite inner and outer groove flanks 53 and 54. The sealing body 16 has a foot section 26 thereof placed in the associated annular groove 25 and extends—as seen in the initial position in accordance with FIGS. 1, 8 and 5—at a sealing bead 24 through the groove opening 55 axially from the annular groove 25 and accordingly projects past the principal body 15 in an axial direction.

Preferably the foot section 26 of the sealing body 16 engages the groove floor 52 and simultaneously bears on the two groove flanks 53 and 54. The sealing bead 24 more particularly has a smaller width than the foot section 26 and the width of the annular groove 25 so that its portion within the groove 25 is spaced from the two groove flanks 53 and 54.

The principal body 15 is chiefly responsible for the dimensional stability of the sealing ring. It preferably consists of a thermoplastic plastic material. For the sealing function the two sealing bodies 16 are responsible, which respectively preferably consist of an elastomeric plastic material. The manufacture of the sealing ring 12 may more especially take place using a two-component injection molding operation. In this case the principal body, which consists of harder plastic material, is preferably firstly produced, following which simultaneously or in sequence the two sealing bodies 16 are produced by the application by injection of the corresponding plastic material.

It would be possible to so design the sealing ring 12 that it is only on one axial side that it has a sealing body 16 with rubber-elastic properties. The sealing function on the other axial side could then be performed by other measures, as for example one or more annular projections on the principal body. Preferably however use is made of the embodiments with a sealing body on each axial side.

The annular grooves 25 are so designed that their capacity is at least equal to the volume of the associated sealing body 16. A configuration is preferred in the case of which the capacity of the annular groove 25 is equal to or only slightly larger than the volume of the associated sealing body 16 as is the case with the embodiments.

Owing to this mutually matching design it is possible to ensure that, during a deforming action on the sealing bead 24 of the associated sealing body 16, the material as well, which defines the sealing bead 24, may be taken up by the annular groove 25. This is made clear in FIGS. 6 and 7, which show a part of the sealing body 16 during different conditions of load.

If the sealing ring 12 is moved into the use position between the two components 1 and 2 the sealing body 16 will firstly assume the initial position illustrated in FIG. 5, in the case of which it has its sealing bead 24 projecting past the principal body 15. If now the second component 2, as for example owing to a screwing operation, is shifted in the direction 5 of movement against the principal body 15 its second sealing face 8 provided on it will be thrust against the sealing bead 24 causing deformation thereof into the amply dimensioned volume of the annular groove 25. FIG. 6 shows a state in which the second component 2 is manually screwed as far in that its second sealing face 8 engages the end face 56, adjoining the groove opening 55, of the principal body 15. Even in this intermediate condition the sealing body 16 is squeezed into the annular groove 25.

In order to arrive at the final condition the second component 2 is then tightened using the necessary torque. Then, as this takes place, the principal body 15 is slightly deformed and furthermore the sealing body 15 experiences furthermore action thereon so that it firstly approximately fills the volume of the annular groove 25. The originally convexly curved second sealing section 14 is then flattened and to extend flush with the adjacent end face 56, it contacting the sealing faces 8 of the second component 2 over a large area.

Since the material of the sealing body 16 completely received in the annular groove 25 while at the same time being supported by the groove floor 52 and by the two groove flanks 53 and 54, the sealing body 16 may develop an opposing force with which its second sealing section 14 is relatively firmly thrust against the second sealing face 8. Accordingly a strong sealing contact and accordingly a high quality sealing effect is ensured.

FIGS. 5 through 7 show only one of the sealing bodies 16 of the sealing ring 12. Conditions at the other sealing body 16 (not illustrated) and the first component 1 cooperating with it are similar and changes occur synchronously.

The groove flanks 53 and 54 are preferably oblique in form and run toward one another as indicated by the arrow 57. At the groove opening 54 the annular groove 25 has a larger width than at the groove floor 52.

In order to provide the sealing bead 24 with the desired space for deformation within each annular groove 25 an annular free space 58 and 59 is provided on either side of the sealing bead 24. The free spaces 58 and 59 receive the deformed material of the sealing bead 24.

The free spaces may in principle be constituted by groove-like recesses of the sealing body 16 itself so that same are delimited radially outward and radially inward by material of the sealing body. However the design in the working examples has turned out to be more advantageous, in the case of which the free spaces 58 and 59 are on the one hand delimited by the sealing bead 24 and accordingly by the material of the sealing body 16, while on the other hand however they are delimited by the associated inner and, respectively, outer groove flank 53 and 54. This is particularly well illustrated in FIG. 5.

The two mutually concentric free spaces 58 and 59 are conveniently so designed that the free space 58 provided radially within the sealing bead 24 has a larger cross section than the outer free space 59 provided radially outside the sealing bead 24. The cross sectional configuration of the sealing body 16 involved here ensures that during axial loading by the facing the sealing faces 7 and 8 the sealing bead is preferentially bent toward the inner free space 58 with a larger cross section. Since when the components 1 and 2 are screwed together the sealing bead 24 tends to be displaced outward, this displacement operation will accordingly be opposed and displacement of the sealing bead 24 in front of the end face 56 will be effectively prevented. Accordingly it is impossible for the sealing bead 24 to be nipped between the end face 56 and the facing sealing face 8.

In the working embodiment illustrated in FIGS. 1 through 7 the inner free space 58 is made deeper than the outer free space 59. Simultaneously the inner free space 58 is wider than the outer free space 59. The latter feature also applies sealing ring 12 in accordance with FIGS. 8 and 9, in the case of which however the two free spaces 58 and 59 have approximately the same depth.

The annular groove 25 and the sealing body 16 secured therein each have a constant cross section for their full lengths. The cross sectional area of the annular groove 25 is at least as large as the cross sectional area of the sealing body 16 in the initial state, but however is preferably at least slightly larger than the cross section of the sealing body 16.

In all working examples the sealing bodies 16 are connected together by molding as part of an injection molding operation.

In the working embodiments illustrated in FIGS. 1 through 7 the two sealing bodies 16 are formed separately from each other. They are molded on the principal body 15 separately from each other. At one point on its periphery the principal body 15 has a recess 62 on each axial side, such recess 62 constituting the sprue for the injection mold process and being filled in the finished state of the sealing ring 12 with the material of the sealing body 16.

Figure 8:
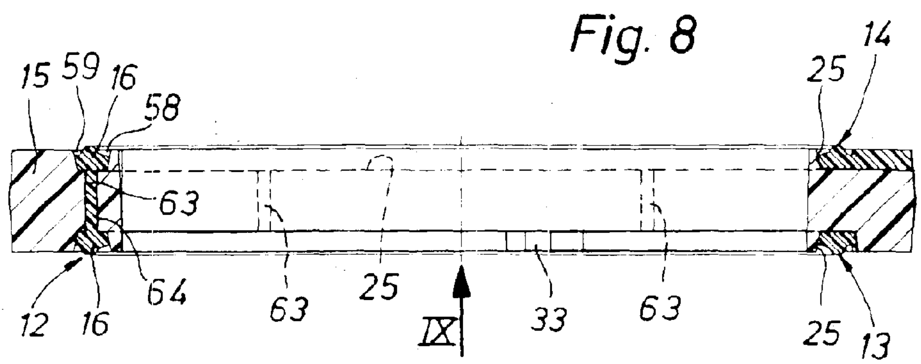
FIG. 8 shows in a manner of representation similar to that of FIG. 1 an alternative design of the sealing ring without showing the components to be sealed off and in a section whose section plane extends axially and radially in accordance with the section line VIII—VIII as in FIG. 9.
Figure 9:
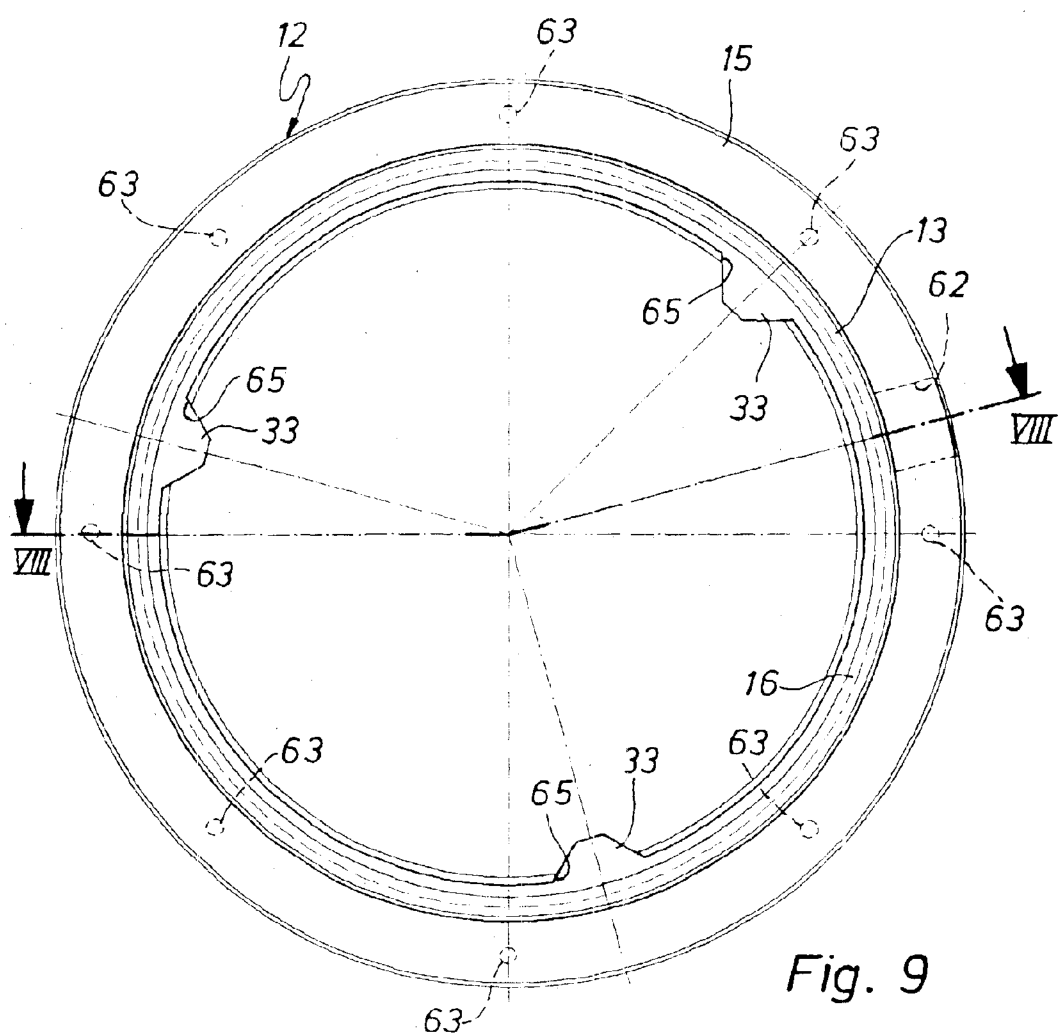
FIG. 9 is a view from below of the sealing ring of FIG. 8 looking in the direction indicated by the arrow IX.

In the case of the sealing ring of FIGS. 8 and 9 as well the two sealing bodies 16 may be manufactured separately using suitable sprues. As a rule however one single sprue 62 will be sufficient, because other measures are adopted rendering possible passage of the plastic material between the two axial sides of the principal body 15. These measures include a plurality of connecting ducts 63, which extend through the principal body 15 in the axial direction and connect the two annular grooves 25 with each other. They preferably open on the floor 52 of the respective annular groove 25. The connecting ducts 63 are preferably distributed evenly over the length of the periphery of the principal body 15.

During injection molding the plastic material constituting the sealing body 16 is injected by way of the recess 62, which opens into the one annular groove 25. The material will fill the annular groove 25 and at the same time will move into the other annular groove 25 by way of the connecting ducts 63, such groove 25 also being filled with material in accordance with the desired shape. In the finished state the two sealing bodies 16 are accordingly connected together integrally by way of the material bridges 64 of plastic material in the connecting ducts 63.

Owing to material bridges 64 furthermore a still better anchoring of the sealing bodies 64 on the principal body is ensured. Owing to the material bridges 64 the respectively one sealing body 16 is held in the oppositely placed sealing body 16 in the annular groove.

Preferably the sealing rings 12 possess a plurality of retaining projections 33 distributed about the inner periphery, such projections serving to tether the sealing ring 12 in a non-releasable manner on the screw threaded part 4 or a similar component. Additionally or as an alternative the retaining projections 33 may also serve to ensure maintaining a desired concentric relative position of the sealing ring 12 on the one hand and the sealing faces 7 and 8 of the components on the other hand. The retaining projections 33 accordingly serve for centering.

The retaining projections 33 are formed integrally with each respective sealing body 16 and extend past the principal body 15 radially inward. If the sealing ring 12 as in the working embodiments has two sealing bodies 16, then it is only necessary for the retaining projections 33 to be provided on one sealing body 16. They may be molded on simultaneously with the manufacture by injection molding of the respective sealing body.

At the retaining projections 33 the sealing body 16 possesses openings 65 at the respective axial side, such openings permitting passage of the retaining projections 33 from the annular groove 25 to the inner space of the sealing ring 12 without the material emerging past the end face 56 of the principal body 15.

Since the retaining projections 33 consist of rubber-like elastic material they do not impede the fitting of the sealing ring 12 on the screw threaded part. The sealing ring 12 may be slipped into position coaxially with some temporary elastic deformation of the retaining projections 33 readily, without any screwing operation being necessary.

The distribution of the retaining projections 33 along the peripheral length of the sealing ring 12 is preferably even, three retaining projections 33 being present in the working examples.

In all working embodiment the two free spaces 58 and 59 do not extend as far as the floor 52 of the annular groove 25. The base face 65 of the free spaces is defined by the foot section 26 occupying the entire groove width. As shown in FIG. 5 in chained lines at 66, however there is the advantageous possibility of so designing the free space 58 at least that it extends for the full depth of the annular groove 25. In the initial condition there is accordingly no contact between the sealing body 16 and the inner groove flank 53.

In all working examples the free spaces 58 and 59 are preferably so dimensioned that, when sealing body 16 is fully in the annular groove 25, the material of the sealing body 16 engages both the groove floor 52 and also the two radial groove flanks 53 and 54 and is accordingly supported here. The individual features of the working example described may be combined or exchanged in any desired fashion.

What is claimed is:

1. A sealing ring comprising:

an annular principal body responsible for dimensional stability and which on at least one axial side possesses a concentrically arranged annular groove having two radially opposite groove flanks, in which a sealing body, manufactured of rubber-elastic material, is held, which has a sealing bead projecting axially past the principal body, wherein within the annular groove an annular inner free space is provided radially within the sealing bead to receive the deformed material, and an annular outer free space is provided radially outside the sealing bead, the inner free space having a larger cross section at any point annularly than the outer free space, and wherein the capacity of the annular groove is at least equal to the volume of the sealing body so that the annular groove is in a position of also accepting the material, which defines the sealing bead, of the sealing body when the sealing bead is acted upon and deformed.

2. The sealing ring as set forth in claim 1, wherein the flanks of the annular groove run together in the direction of the groove's depth.

3. The sealing ring as set forth in claim 1, wherein the annular groove has a greater width at the groove opening than at the groove floor.

4. The sealing ring as set forth in claim 1, wherein each annular free space is delimited radially on the one hand by the sealing bead and on the other hand by the associated groove flank.

5. The sealing ring as set forth in claim 1, wherein the inner free space is deeper than the outer free space.

6. The sealing ring as set forth in claim 1, wherein the inner free space, at least at the groove opening, is wider than the outer free space.

7. The sealing ring as set forth in claim 1, wherein the capacity of the annular groove is equal to or slightly larger than the volume of the sealing body.

8. The sealing ring as set forth in claim 1, wherein the sealing body has a foot section resting against the groove floor and bearing against the two groove flanks, from which foot section the sealing bead projects, which has a smaller width than the width of the annular groove.

9. The sealing ring as set forth in claim 1, wherein both the principal body and also the at least one sealing body is manufactured of plastic.

10. The sealing ring as set forth in claim 9, wherein the at least one sealing body is molded on the principal body by injection molding.

11. The sealing ring as set forth in claim 1, wherein the principal body consists of a thermoplastic plastic material.

12. The sealing ring as set forth in claim 1, wherein the at least one sealing body consists of an elastomeric plastic material.

13. The sealing ring as set forth in claim 1, wherein at its inner periphery a plurality of retaining projections is provided distributed about its periphery, such retaining projections being made integrally with at least sealing body and extending radially inward in relation to the principal body.

14. The sealing ring as set forth in claim 1, wherein on both axial sides of the principal body a sealing body is provided arranged in a correspondingly shaped annular groove.

15. The sealing ring as set forth in claim 14, wherein the two sealing bodies are made separately from one another.

16. The sealing ring as set forth in claim 14, wherein the two sealing bodies are connected together by material bridges integrally, such bridges extending through the principal body axially at peripherally distributed points.

17. A sealing ring comprising:

an annular principal body responsible for dimensional stability having two axial sides, and which on at least one of the two axial sides is a concentrically arranged annular groove having two radially opposite groove flanks, in which a first rubber-elastic sealing body is held, the first sealing body having a sealing bead projecting axially past the principal body, wherein within the annular groove an annular inner free space is provided radially within the sealing bead to receive the deformed material, and an annular outer free space is provided radially outside the sealing bead, the inner free space having a larger cross section than the outer free space, and wherein the capacity of the annular groove is at least equal to the volume of the first sealing body so that the annular groove is in a position of also accepting the material, which defines the sealing bead, of the first sealing body when the sealing bead is acted upon and deformed, and a second sealing body is provided on the other axial side of the principal body, the second sealing body is arranged in an annularly shaped groove, and wherein the first and second sealing bodies are connected together by material bridges integrally, such bridges extending through the principal body axially at peripherally distributed points.

* * * * *